Patented Dec. 25, 1945

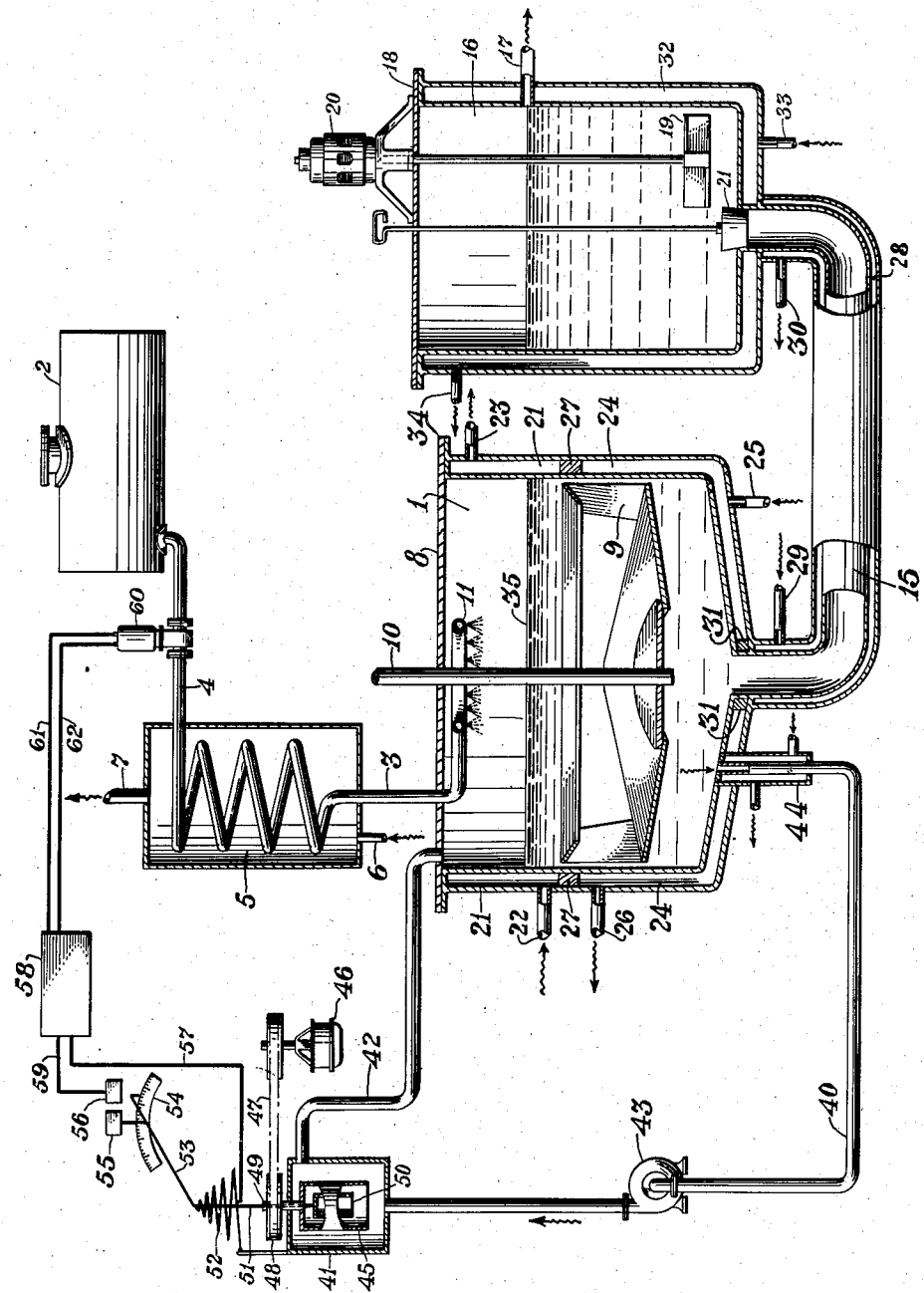
Raphael T. Coffman
Barnard M. Marks
INVENTORS

2,391,393

UNITED STATES PATENT OFFICE 2,391,393

POLYMERIZATION OF ORGANIC LIQUIDS

Raphael T. Coffman, North Arlington, and Barnard M. Marks, Newark, N. J., assignors to E. I. du Pont de Nemours & Company, Wilmington, Del., a corporation of Delaware Application October 23, 1943, Serial No. 507,412

5 Claims. (Cl. 260—83)

This invention relates to the polymerization of organic liquids capable of polymerizing to form thermoplastic synthetic resins, and is particularly concerned with the continuous polymerization of these organic liquids to form polymeric syrups and with apparatus for use in such continuous polymerizations.

It is the practice in the art to employ polymeric syrups composed of polymeric material dissolved in monomeric material, in the casting of polymerizable liquid organic compounds such as methyl methacrylate and the like. While such syrups can be made up by dissolving preformed polymer in monomer, it has proven more practical to subject a quantity of monomer to controlled polymerization conditions in order that a fraction of the monomer may be transformed into polymer and the desired syrup thus obtained. The formation of syrups in this way by batch processes is not particularly satisfactory because of lack of uniformity between batches so that a continuous process of forming these syrups, with its inherent advantages of uniformity of product and economy in operation, is greatly preferred.

Heretofore, despite the obvious inherent advantages of a continuous process of forming syrups of polymer in monomer, such a process has not been used commercially due to certain practical difficulties encountered. For a continuous process to produce a constantly uniform syrup, which is a requisite of an acceptable process, some means for automatically controlling the rate and extent of polymerization is necessary and a satisfactory and economical means for accomplishing this has not been available heretofore. Further, as polymer is formed during the process, it has a pronounced tendency to adhere to and build up crusts or lumps of polymer on exposed surfaces of the reaction vessel in which the polymerization is carried out, especially at the air-liquid interface. To avoid uneconomical interruptions of the continuous process, these polymer adhesions must be prevented in the reaction vessel and on the walls of the syrup take-off line.

An object of the present invention is to provide a process whereby polymerizable vinyl and substituted vinyl organic liquids capable of polymerizing to form thermoplastic synthetic resins, may be continuously polymerized to form syrups of polymer dissolved in monomer which syrups have a substantially unvarying predetermined polymer content. A further object is to provide means for automatically controlling the viscosity and polymer content of syrups made in a continuous process. A still further object is to provide means for preventing the adhesion of the polymeric material to the exposed walls of the apparatus used in a continuous polymerization process for forming these syrups. A further object is to provide means for automatically maintaining a substantially constant level of reactants in a reaction vessel during a continuous polymerization process. Other objects will be apparent from the description of the invention given hereinafter.

The above objects are accomplished according to the present invention by continuously polymerizing a monomeric polymerizable liquid organic compound to form a syrup of polymer dissolved in monomer, by adding to a syrup of polymer in monomer contained in a reaction vessel at an elevated temperature to favor polymerization at an economical rate, monomer at such temperature and rate that the temperature and viscosity of the syrup in the reaction vessel are maintained substantially constant, and simultaneously withdrawing from the reaction vessel syrup in quantity equal to the quantity of monomer being added, and cooling the syrup immediately upon withdrawal from the reaction vessel. Since the viscosity of the syrup being formed is an indication of its polymer content, it follows that maintaining the viscosity of the syrup in the reaction vessel substantially constant means that the polymer content of the syrup will be substantially constant.

The invention further resides in an apparatus for continuously polymerizing these liquid organic compounds to form a syrup of polymer dissolved in monomer, which apparatus essentially comprises a reaction vessel, means for adjusting the temperature of monomer before introduction into the reaction vessel, means for automatically controlling addition of monomer to the reaction vessel to maintain the syrup therein at substantially constant viscosity, means for automatically maintaining the syrup in the reaction vessel at a constant level, and means for preventing polymer adhesion to the exposed surfaces of the reaction vessel and associated parts of the apparatus.

More particularly, the apparatus of the present invention comprises a reaction vessel, a line for introducing monomer therein and communicating with a source of monomer, a temperature adjuster through which this line passes, a viscosimeter, lines connecting the viscosimeter and the reaction vessel, a pump in one of the latter lines for circulating syrup from the reaction vessel through the viscosimeter and back to the reaction vessel, a valve in the line running from the source of monomer to the reaction vessel, this valve preferably being placed between the preheater and the source of monomer, means controlled by the viscosimeter for operating the valve to permit flow of monomer into the reaction vessel, a take-off line for the syrup communicating with the bottom of the reaction vessel, and means for preventing polymer adhesions from forming on the exposed surfaces of the reaction vessel and take-off line, together with means for maintaining the reactants in the reaction vessel at a constant level.

The apparatus of the present invention will be more particularly described with reference to the accompanying drawing in which the single figure is a vertical section through a preferred apparatus embodying the present invention, the apparatus being shown more or less diagrammatically.

In the apparatus shown in the drawing the reaction vessel 1 is connected to a source of monomer supply such as the storage tank 2 by the lines 3 and 4 and the interposed temperature adjuster 5 provided with inlet 6 and outlet 7 for a heating or cooling liquid. Reaction vessel 1 is provided with a cover 8 and a dasher-plate agitator 9 carried on the shaft 10 which connects with any conventional drive source not shown. The line 3 terminates in a sparger 11 circumposed about the agitator shaft 10. The relatively large take-off line 15 connects the reaction vessel 1 and the syrup cooler 16 which is provided with the take-off line 17, cover 18, and agitator 19 driven by the motor 20. The removable plug 21 blocks the opening of take-off line 15 into the cooler 16 and is used only at the start of the operation.

The reaction vessel 1 is equipped with the upper jacket 21 having inlet 22 and outlet 23 for a cooling liquid and a lower jacket 24 having inlet 25 and outlet 26 for a heating fluid, with an insulating layer 27 between the two jackets. Take-off line 15 is provided with the cooling jacket 28 having inlet 29 and outlet 30 for a cooling liquid, and is insulated from the heating jacket 24 by the insulation 31. Likewise, the cooler 16 is provided with a cooling jacket 32 having inlet 33 and outlet 34 for a cooling liquid.

At the start of operations the liquid monomer is run from storage tank 2 into reaction vessel 1 up to the desired level as at 35, the plug 21 being in position to prevent flow through the take-off line 15 into the cooler 16. As the temperature of the monomer in vessel 1 is raised and polymerization commences, additional monomer is added to vessel 1 and an equal amount of syrup is allowed to flow into the cooler 16 by momentarily raising the plug 21; additional monomer is added from time to time and syrup is allowed to flow into the cooler 16 in amounts equal to the monomer being added until the level of the syrup in cooler 16 reaches the take-off pipe 17 which is placed at the level desired to be maintained in the vessel 1. Thereupon the plug 21 is removed entirely and thereafter the level of the syrup in reaction vessel 1 is kept constant automatically by syrup overflowing through pipe 17 as monomer is added to the reaction vessel 1.

The apparatus described is especially designed to avoid any difficulty resulting from the tendency of polymer to adhere to the exposed surfaces of the apparatus. The sparger 11 prevents polymer adhesions forming on the agitator shaft 10 as the monomer being introduced through sparger 11 washes off any polymer on the shaft 10.

The greatest difficulty with polymer adhesions, however, occurs at the vapor-liquid interface within the reaction vessel 1, that is, at the level of the polymerizing liquid designated by reference numeral 35. This difficulty is avoided in the instant apparatus by the practical application of the discovery that polymer adhesions will not form on a surface kept at a temperature appreciably lower than the temperature of the polymerizing liquid. While the minimum temperature differential will vary somewhat depending upon conditions, it has been found that a temperature differential of at least 20° C. is desirable and a temperature differential in excess of 60° C., while entirely operative, is usually undesirable because of the heat balance conditions involved in the process.

Application of this discovery of the effectiveness of cold zones in preventing polymer adhesions is found in the illustrated apparatus in the upper cooling jacket 21 of reaction vessel 1. Heat must be supplied to the reactants in vessel 1 for the polymerization to progress at an economically rapid rate and this heat is supplied by the lower jacket 24. But the cooling jacket 21 extends down the reaction vessel 1 to the lowest point that the level of the polymerizing liquid will reach during the normal operation of the process and, as a safety factor, slightly below that level. The distance below the level of the polymerizing liquid that the cooling jacket 21 extends, is not critical although it is desirable to keep this distance at a minimum because of the heat dissipation involved.

Advantage of this cold zone principle is also taken by providing a cooling jacket 28 on the take-off line 15 and the cooling jacket 32 on the cooler 16. These two cooling jackets also have the effect of cooling the syrup immediately as it leaves the reaction vessel 1 and thus abruptly terminating the polymerization reaction which also tends to prevent polymer adhesions from forming.

During the operation of the polymerization process monomer is added to the reaction vessel 1 from time to time to replace monomer converted to syrup in reaction vessel 1 and thus to maintain the polymer content of the syrup therein substantially constant. Control of the addition of monomer is based on the viscosity of the syrup in reaction vessel 1, the viscosity changes being sufficiently proportionate to fluctuations in the polymer content of the syrup for the purpose. To effect this control syrup from reaction vessel 1 is constantly recirculated through the line 40, the viscosimeter 41 and the line 42 back to reaction vessel 1, pump 43 being provided in the line 40 to circulate the syrup and the cooling jacket 44 being provided on the line 40 adjacent reaction vessel 1 to prevent polymer adhesions in the line 40.

The viscosimeter 41 consists of the rotating cylinder 45 driven by the constant speed motor 46 through the belt 47 and pulley 48, the latter being carried by the hollow shaft 49 on which cylinder 45 is mounted. The cylinder 45 rotates about a drag cylinder 50 mounted on the shaft 51 which passes through shaft 49 and is free to rotate except as opposed by the coil spring 52 attached to it. As the viscosity of the syrup passing through the viscosimeter 41 increases, the drag on cylinder 50 by the rotating cylinder 45 also increases, and the cylinder 50 turns to some extent against the resistance of coil spring 52; by means of the indicator arm 53 attached to shaft 51 and turning therewith, the extent cylinder 50 is rotated can be measured against the scale 54 and, hence, the viscosity of the syrup in viscosimeter 41 determined.

The indicator arm 53 also carries a condenser plate 55 adapted to move to and away from stationary condenser plate 56. Through the electric conduit 57 attached to spring 52, the condenser plate 55 is electrically connected to the electronic control 58; condenser plate 56 is also connected to the control 58 through an electric conduit 59. In turn, the electronic control 58 is connected to the solenoid valve 60 in the monomer line 4 by electric conduits 61 and 62.

The indicator arm 53 is suitably adjusted so that when the viscosity of the syrup passing through the viscosimeter 41 rises above a certain predetermined point, the condenser plate 55 is swung into position opposite condenser plate 56 thereby activating the electronic control 58 which causes an electric current to open the solenoid valve 60 and permit monomer to pass into the reaction vessel 1. When sufficient monomer has been added to reaction vessel 1 to lower the viscosity of the syrup therein to a predetermined point, the indicator arm 53 will have moved to such an extent that its associated condenser plate 55 is separated from condenser plate 56 sufficiently so that the control 58 is no longer activated and, hence, the valve 60 closes and shuts off the flow of monomer into the reaction vessel 1. It will be apparent that through this arrangement addition of monomer to reaction vessel 1 is automatically controlled to maintain therein a syrup of substantially constant viscosity and, consequently, substantially constant polymer content.

In operating according to the present invention, the temperature adjuster 5 plays an important part. The particular type of temperature adjuster is by no means critical as any standard design of heat exchanging equipment could be employed. However, the temperature adjuster should be constructed and operated so as to prevent polymerization of the monomer prior to its addition to the reaction vessel and at the same time adjust the temperature of the monomer so that it will absorb and counterbalance the heat of polymerization and thus prevent an accumulation of heat which would cause the reaction to get out of control. Consequently, it may be necessary to operate the temperature adjuster 5 so as to cool the incoming monomer under some conditions while under other conditions it may be necessary to heat the monomer. Further, the temperature of the incoming monomer preferably should be adjusted so that its density is sufficiently similar to that of the syrup in the reaction vessel so as to prevent stratification. If the reactants should stratify to any appreciable extent, it would tend to upset the accurate functioning of the apparatus controlling the addition of the monomer as it is preferable to withdraw syrup from the bottom of the reaction vessel for circulation through the viscosimeter and syrup from that region obviously would not be representative if there were stratification.

While a preferred specific embodiment of the apparatus of this invention has been described, it will be apparent that this can be varied considerably without departing from the scope of the present invention. The particular means shown in the drawing for operating the solenoid valve 60 to control introduction of monomer is very advantageous but many other specific devices could be used. A photo electric cell could be substituted for the capacitance comprising the condenser plates 55 and 56. A falling-sphere type of viscosimeter operating on the principle of a rotameter could be used in place of the continuous-measuring viscosimeter 41. The change of refractive index with change in the polymer content of the syrup may be employed to control the polymer content of the syrup by having a change of refractive index of the syrup change the position of a beam of light refractively passing through the syrup and thereby actuate an electronic control through a photo electric device. Further, especially in preparing syrups of high viscosity, the variation in the force necessary to agitate the syrup due to variations in the viscosity of the syrup may be used by coupling the appropriate means to the agitator shaft 10 to measure this variation and thus controlling the valve 60. Other equivalent devices will occur to those skilled in the art.

In the case of many monomers oxygen serves to inhibit the polymerization reaction so it is preferable to prevent the incorporation of oxygen in the polymerizing syrup. This may be accomplished by blanketing the space above the syrup in reaction vessel 1 with an inert atmosphere such as nitrogen and in such case continuous agitation of the syrup may be employed with practically any type of efficient agitator such as paddle stirrers and the like. If an atmosphere of oxygen or air is employed, however, a dasher-type agitator as illustrated in the drawing is preferred and intermittent agitation of the syrup is useful in overcoming the inhibiting effect of the oxygen present. If intermittent agitation is employed, it is preferable to have a control means close the solenoid valve 60 at all times when the agitator is not in motion so that monomer will only be introduced into the reaction vessel at a time when the agitator will immediately blend it with the syrup in the reaction vessel.

The following examples wherein all proportions are by weight unless otherwise noted, illustrate specific embodiments of the process of this invention:

*Example I*

An apparatus as heretofore described is used. The monomer tank 2 is charged with methyl methacrylate monomer containing 10% dibutyl phthalate and 60 P. P. M. lauryl peroxide. Sufficient of this monomer is allowed to run into the reaction vessel 1 to bring the liquid level to that indicated by 35. The plug 21 is kept in place to prevent monomer from entering the cooler 16. With the agitator 9 running continuously, the monomer in reaction vessel 1 is heated to a temperature of 75° C. by means of hot water circulating through the heating jacket 24. When the monomer has reached a temperature of 75° C., continuous agitation is terminated and intermittent agitation of 1 stroke per minute is begun. This intermittent agitation is continued until the contents of the reaction vessel attain a viscosity of approximately 1 poise. At this point water at a temperature of about 70° C. is circulated through the temperature adjuster 5 to bring the temperature of the monomer passing through the adjuster 5 to that temperature. As the polymerization proceeds, the viscosity of the reaction mixture increases until it reaches 1.8 poises. At this point the condenser plate 55 has moved into a position causing the electronic control 58 to actuate the solenoid valve 60 to an open position. This permits monomer to flow from the storage tank 2 through the temperature adjuster 5 and finally to issue from the sparger 11 into reaction vessel 1 where it is incorporated in the syrup. This addition of the monomer to the syrup causes a reduction in viscosity in the syrup and as soon as the viscosity of the syrup has reached a value of 1.7 poises, the adjustment of the controlling apparatus is such that the valve 60 closes. In this manner, monomer is automatically added to the reaction vessel 1 in a pre-tempered condition so that the reaction proceeds smoothly and at such a rate that the viscosity is maintained substantially constant. Since the polymerizing mixture is blanketed with an atmosphere of air, intermittent agitation is employed, that is, a cycle consisting of 1.5 minutes of agitation followed by 2.5 minutes of rest is employed. During the period of agitation, the agitator 9 is operated at 34 strokes per minute. The electronic control 58 is mechanically connected with the agitator driving means in such a fashion that when the agitator 9 is not in operation, the valve 60 may not open. Thus, monomer may not enter the reaction vessel except when agitation is in progress.

As fresh monomer enters the reaction vessel 1, an equivalent mass of syrup is withdrawn through take-off line 15 into the syrup cooler 16 by partially removing the plug 21. Once the level of the syrup in the cooler 16 has reached the level of the take-off line 17 and is overflowing through it into storage, this plug 21 may be removed and the level of the syrup in reaction vessel 1 is maintained constant automatically thereafter.

Throughout the entire operation cold water of a temperature of 20° C.–25° C. is circulated through jacket 21 and, likewise, such cold water is circulated through jackets 28, 32 and 44.

When operating in this fashion there results a continuous formation of a solution of polymeric methyl methacrylate in monomeric methyl methacrylate, i. e., a syrup possessing a viscosity of 1.8±0.2 poises at the rate of approximately 25 pounds per hour. The resulting syrup possesses no lumps of polymer nor any other undesirable characteristics.

This same procedure may be followed by charging the reaction vessel 1 with a quantity of a syrup obtained from a previous polymerization.

*Example II*

Monomeric methyl methacrylate containing 10% dibutyl phthalate and 60 P. P. M. lauryl peroxide are charged into the monomer storage tank 2. Reaction vessel 1 is purged with nitrogen and throughout this entire reaction nitrogen gas is allowed to sweep over the contents of the reaction vessel. The polymerization is carried out in a manner similar to that in Example I. However, in lieu of intermittent agitation, continuous agitation is employed as the blanket of nitrogen makes continual agitation possible without any inhibiting effect such as would be caused if an atmosphere or air was maintained above the polymerizing syrup. Operating in this manner, a syrup possessing properties comparable to those of the syrup in Example I is produced at approximately the same rate.

It will be understood that the above examples are merely illustrative and that the present invention is broadly applicable to polymerizable liquid organic compounds capable of polymerizing to form thermoplastic synthetic resins.

Chemically, these polymerizable liquid organic compounds are, in general, vinyl or vinyl substituted compounds which contain a methylene ($CH_2$) group attached by an ethlyenic double bond to a carbon atom, which is in turn attached to at least one organic radical containing a carbon atom joined to a second atom by more than one bond, the multi-bonded carbon atom being separated from the above-mentioned ethylenic double-bonded carbon atom by not more than one atom, e. g., the acetoxy, acetyl, carboxy, cyano, phthalimido, carboxyalkyl radicals and the like. Such compounds may be represented by the formula $CH_2=C(X)Y$ where X is hydrogen, halogen or an alkyl radical and Y is an organic radical as defined above. The vinyl or substituted vinyl compounds which may be employed, must form polymers or copolymers which are soluble in the corresponding monomeric compounds or mixtures. Compounds which, when employed alone or in certain admixtures, produce monomer insoluble polymer may be employed successfully to form copolymeric syrups provided the resulting copolymers are soluble in the parent monomeric mixture.

Examples of vinyl and substituted vinyl compounds which may be polymerized to polymeric syrups according to the present process, include methyl methacrylate, styrene, vinyl phthalimide, vinyl acetate, ethyl acrylate, ethyl vinyl ketone, vinyl naphthalene, and dimethyl itaconate, and mixtures of these compounds. Mixtures of these compounds with less than equal molar proportions of monoethylenically unsaturated copolymerizable materials such as vinyl ethers, diethyl fumarate, maleic anhydride, mesaconic esters, crotonic esters, N-alkyl maleimides, and the like may also be employed.

Since this invention permits extremely close control over the polymerization process and of the resulting polymer syrup, it is of particular value for use with the polymerization of difficultly controlled materials, e. g., the saturated alcohol esters of acrylic and methacrylic acids and in particular methyl methacrylate or mixtures containing at least 70% by weight of methyl methacrylate.

Catalysts may be added to the reaction mixture and it has been found desirable to accomplish this by adding the same to the monomer prior to its incorporation in the reaction mixture. However, it may be desirable to add the catalyst directly to the reaction vessel rather than to the monomer. In the case where methyl methacrylate is the material being polymerized, it is preferable to employ acyl peroxide as the catalyst in concentrations between 50 and 200 P. P. M. of the monomeric material in order to permit optimum control over the polymerization reaction. Dyes, inhibitors, plasticizers, and other non-volatile materials soluble in the monomer and the polymer syrup may likewise be added to the reaction mixture.

Various temperatures of polymerization may be employed. Thus, for a high rate of polymerization and a consequent high rate of syrup formation, high temperatures may be employed. However, the use of excessively high temperatures generally results in the production of inferior polymeric material and it is therefore advisable to use moderate temperatures and moderate rates of polymerization. The exact range of temperatures which may be practically employed, is dependent upon the monomer used for the formation of the polymeric syrup and the type of polymer desired. For the polymerization of an extremely reactive compound such as methyl methacrylate, temperatures above approximately 80° C. have been found to be undesirable, while low temperatures require excessive lengths of time for polymerization to progress. Thus, a lower temperature limit of approximately 65° C. has been found desirable in the case of this monomer. With certain modes of operation, it may be desirable to employ sub-normal temperatures for the polymerization of monomers according to the process of this invention.

This invention makes possible the continuous production of homogeneous polymeric syrups from polymerizable liquid organic compounds capable of being polymerized to thermoplastic polymers. Polymeric syrups posessing a wide range of viscosity and polymer content may be produced according to the process of this invention. However, the process is especially advantageous for the preparation of syrups possessing a viscosity of between about 0.5 and 50 poises when measured at 25° C. since the continuous production of uniform syrups within this viscosity range is particularly difficult. Furthermore, this invention provides a practical solution to the difficulties which heretofore have prevented the use of a continuous process for the polymerization of these syrups, i. e., means for automatically controlling the rate of addition of monomer to the reaction mixture, the method of preventing the stratification within the monomeric reaction mixture, a method for controlling the exothermic heat evolved in the polymerization reaction and means for the prevention of the accumulation of resins upon the mechanical parts of the polymerization apparatus.

The products of this invention are particularly useful in the casting of shaped articles from plastic materials. Syrups produced by this invention may also be employed for the impregnation of fibrous materials or for use as a cement or adhesives. Likewise, the syrup produced may be employed as a coating material.

As many apparently widely different embodiments of this invention may be made without departing from the spirit and scope thereof, it is to be understood that the invention is not limited to the specific embodiments thereof except as defined in the appended claims.

We claim:

1. Process of continuously polymerizing a monomeric polymerizable liquid organic compound to form a syrup of polymer dissolved in monomer, which process comprises adding to a syrup of polymer dissolved in monomer contained in a reaction vessel at an elevated temperature to induce polymerization of monomer, monomer at such temperature and rate that the temperature and viscosity of said syrup in said reaction vessel are maintained substantially constant, and simultaneously withdrawing from said reaction vessel syrup in quantity equal to the quantity of monomer being introduced, and cooling said syrup immediately upon withdrawal from said reaction vessel.

2. Process of continuously polymerizing monomeric methyl methacrylate to form a syrup of polymer dissolved in monomer, which process comprises adding to a syrup of polymer dissolved in monomer contained in a reaction vessel at an elevated temperature to induce polymerization of monomer, monomer at such temperature and rate that the temperature and viscosity of said syrup in said reaction vessel are maintained substantially constant, and simultaneously withdrawing from said reaction vessel syrup in quantity equal to the quantity of monomer being introduced, and cooling said syrup immediately upon withdrawal from said reaction vessel.

3. Process of continuously polymerizing monomeric methyl methacrylate to form a syrup of polymer dissolved in monomer, which process comprises adding to a syrup of polymer dissolved in monomer contained in a reaction vessel at a temperature of 65° C.–80° C. to induce polymerization of monomer, monomer at such temperature and rate that the temperature and viscosity of said syrup in said reaction vessel are maintained substantially constant, and simultaneously withdrawing from said reaction vessel syrup in quantity equal to the quantity of monomer being introduced, and cooling said syrup immediately upon withdrawal from said reaction vessel.

4. Process of continuously polymerizing a monomeric polymerizable liquid organic compound to form a syrup of polymer dissolved in monomer, which process comprises adding to a syrup of polymer dissolved in monomer contained in a reaction vessel at an elevated temperature to induce polymerization of monomer, monomer at such temperature and rate that the temperature and viscosity of said syrup in said reaction vessel are maintained substantially constant, and simultaneously withdrawing from said reaction vessel syrup in quantity equal to the quantity of monomer being added so that the level of said syrup in said reaction vessel is maintained substantially constant, cooling said syrup immediately upon withdrawal from said reaction vessel, and maintaining the walls of said reaction vessel at the level of said syrup therein at a temperature of at least 20° C. below the temperature of said syrup.

5. Process of continuously polymerizing monomeric methyl methacrylate to form a syrup of polymer dissolved in monomer, which process comprises adding to a syrup of polymer dissolved in monomer contained in a reaction vessel at a temperature of 65° C.–80° C., monomer at such temperature and rate that the temperature and viscosity of said syrup in said reaction vessel are maintained substantially constant, and simultaneously withdrawing from said reaction vessel syrup in quantity equal to the quantity of monomer being added so that the level of said syrup in said reaction vessel is maintained substantially constant, cooling said syrup immediately upon withdrawal from said reaction vessel, and maintaining the walls of said reaction vessel at the level of said syrup therein at a temperature of 20° C.– 60° C. below the temperature of said syrup.

RAPHAEL T. COFFMAN.
BARNARD M. MARKS.